(12) United States Patent
Suehiro et al.

(10) Patent No.: US 10,573,903 B2
(45) Date of Patent: Feb. 25, 2020

(54) WOUND BATTERY INCLUDING NOTCHED CURRENT COLLECTOR SHEET

(71) Applicant: Panasonic Intellectual Property Management Co., Ltd., Osaka (JP)

(72) Inventors: Yuki Suehiro, Osaka (JP); Seiichi Aoki, Osaka (JP); Yasuhiro Suzuki, Kyoto (JP); Katsuhisa Wadasaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 105 days.

(21) Appl. No.: 15/573,566

(22) PCT Filed: Jun. 20, 2016

(86) PCT No.: PCT/JP2016/002942

§ 371 (c)(1),
(2) Date: Nov. 13, 2017

(87) PCT Pub. No.: WO2017/010046

PCT Pub. Date: Jan. 19, 2017

(65) Prior Publication Data

US 2018/0131009 A1    May 10, 2018

(30) Foreign Application Priority Data

Jul. 10, 2015   (JP) ................. 2015-138746

(51) Int. Cl.
*H01M 4/00* (2006.01)
*H01M 6/10* (2006.01)
*H01M 2/08* (2006.01)

(52) U.S. Cl.
CPC ............... *H01M 6/10* (2013.01); *H01M 2/08* (2013.01)

(58) Field of Classification Search
CPC ...... H01M 6/10; H01M 2/08; H01M 10/0431; H01M 10/052; H01M 10/0525; H01M 10/0587
See application file for complete search history.

(56) References Cited

U.S. PATENT DOCUMENTS 6,300,002 B1   10/2001  Webb et al.
2006/0222937 A1  10/2006  Morimoto et al.
(Continued)

FOREIGN PATENT DOCUMENTS

CN  101807725 A    8/2010
JP  2001-345115    12/2001
(Continued)

OTHER PUBLICATIONS

International Search Report of PCT application No. PCT/JP2016/002942 dated Sep. 20, 2016.
(Continued)

*Primary Examiner* — Raymond Alejandro
(74) *Attorney, Agent, or Firm* — McDermott Will & Emery LLP

(57) ABSTRACT

In a winding-type battery, the first electrode and the second electrode are wound via the separator to form an electrode group having first and second end surfaces. The first electrode includes a first current collector sheet, and a first active material layer formed on a surface of the first current collector sheet. A first current collecting lead is connected to the first electrode. The second electrode includes a second current collector sheet, and a second active material layer formed on a surface of the second current collector sheet. A second current collecting lead is connected to the second electrode. At an end of the first electrode that is disposed on the first end surface and/or an end of the first electrode that is disposed on the second end surface, at least a winding termination portion located on the outermost periphery of the electrode group has a notch.

9 Claims, 10 Drawing Sheets

(56) References Cited

U.S. PATENT DOCUMENTS

2013/0316209 A1 11/2013 Masumoto et al.
2015/0050535 A1* 2/2015 Amiruddin ........... H01M 4/133
429/94

FOREIGN PATENT DOCUMENTS

| JP | 2006-278142 | 10/2006 |
|----|-------------|---------|
| JP | 2012-079501 | 4/2012 |
| WO | 2012/111061 | 8/2012 |

OTHER PUBLICATIONS

English Translation of Chinese Search Report dated Oct. 9, 2019 for the related Chinese Patent Application No. 201680033832.0.

* cited by examiner

WOUND BATTERY INCLUDING NOTCHED CURRENT COLLECTOR SHEET

This application is a U.S. national stage application of the PCT International Application No. PCT/JP2016/002942 filed on Jun. 20, 2016, which claims the benefit of foreign priority of Japanese patent application 2015-138746 filed on Jul. 10, 2015, the contents all of which are incorporated herein by reference.

TECHNICAL FIELD

The present invention relates to a winding-type battery, particularly to a winding-type battery including a cylindrical metal can having a small outer diameter.

BACKGROUND ART

Recently, the performance of portable devices has been remarkably increasing. It is desired that power sources of such portable devices are small and have a high capacity. While, the manufacturing of high-capacity batteries becomes difficult as the sizes of the batteries become small.

Patent Literature 1 discloses a battery having a small cylindrical metal can and a sealing member for sealing an opening of the metal can. A winding-type electrode group is accommodated in the metal can. The electrode group includes first and second electrodes, and a separator is interposed between the electrodes. The separator projects on an end surface of the electrode group. The separator thus prevents contact between an electrode and a battery can that have different polarities, and prevents a short circuit between an end of one electrode and an end of the other electrode.

CITATION LIST

Patent Literature

PTL 1: International Patent Publication No. 2012/111061

SUMMARY OF THE INVENTION

When an electrode group having a small diameter is used, even the electrode disposed on the outermost periphery of the electrode group has a very small curvature radius. Therefore, at the winding termination portion of the electrode and/or separator disposed on the outermost periphery of the electrode group, an unexpected positional displacement can occur due to the curvature difference between the inner periphery and the outer periphery. On the outermost periphery of the electrode group, a positional displacement in a winding axis direction and a folding of the separator are apt to occur. Therefore, the probability of the occurrence of an internal short circuit becomes high near the end surface of the electrode group.

In view of the above-mentioned problems, a winding-type battery of one aspect of the present disclosure includes a power generating element and a battery case accommodating the power generating element. The power generating element includes a first electrode, a second electrode having a polarity different from that of the first electrode, a separator interposed between the first electrode and the second electrode, and an electrolyte. The first electrode and the second electrode are wound via the separator to form an electrode group having a first end surface and a second end surface opposite to the first end surface. The first electrode includes a first current collector sheet and a first active material layer formed on a surface of the first current collector sheet. A first current collecting lead is connected to the first electrode. The second electrode includes a second current collector sheet and a second active material layer formed on a surface of the second current collector sheet. A second current collecting lead is connected to the second electrode. In at least one of an end of the first electrode that is disposed on the first end surface and an end of the first electrode that is disposed on the second end surface, a winding termination portion located on the outermost periphery of the electrode group has a notch.

The present disclosure can provide a small winding-type battery that hardly generates an internal short circuit.

DESCRIPTION OF EMBODIMENT(S)

Figure 1:
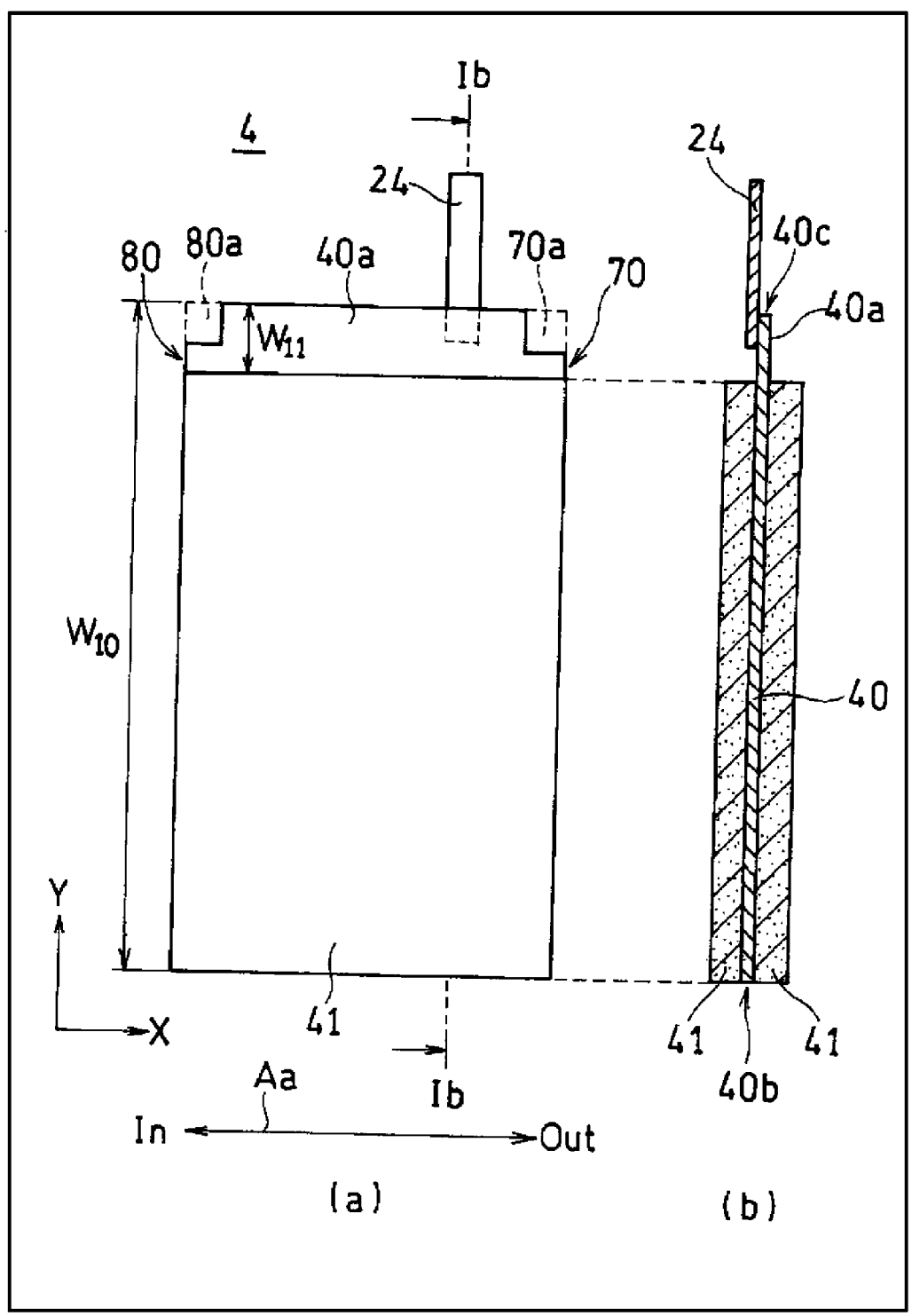
FIG. 1 is a diagram schematically showing a first electrode in which a first current collecting lead is connected to a first uncoated portion, (a) is a plan view schematically showing the first electrode in which the first current collecting lead is connected to the first uncoated portion, and (b) is a sectional view of the first electrode taken along line Ib-Ib.

A winding-type battery of the present disclosure includes a power generating element and a battery case accommodating the power generating element. The power generating element includes a first electrode, a second electrode having a polarity different from that of the first electrode, a separator interposed between the first electrode and the second electrode, and an electrolyte. The first electrode and the second electrode are wound via the separator to form an electrode group having a first end surface and a second end surface opposite to the first end surface.

The first electrode includes a first current collector sheet, and a first active material layer formed on a surface of the first current collector sheet. A first current collecting lead is connected to the first electrode. The second electrode includes a second current collector sheet, and a second active material layer formed on a surface of the second current collector sheet. A second current collecting lead is connected to the second electrode.

A notch or cutout is formed in at least a winding termination portion disposed on the outermost periphery of the electrode group, in at least one of an end of the first electrode that is disposed on the first end surface and an end of the first electrode that is disposed on the second end surface. Forming such a notch in one electrode disposed on the outermost periphery of the electrode group produces the following advantage. Even if the following problems occur:

a positional displacement occurs due to the curvature difference between the inner periphery and the outer periphery in a winding termination portion of the electrode and/or separator;

a winding displacement occurs in a winding axis direction; and a folding of the separator occurs, the probability of existing of the separator between the electrodes near the end surface of the electrode group is high, thereby suppressing an internal short circuit.

The battery case includes a bottomed cylindrical or pipe-shaped metal can and a sealing member for blocking an opening in the metal can, for example. In this structure, one of the first current collecting lead and second current collecting lead is electrically connected to the sealing member, and the other is electrically connected to the inner surface of the metal can. As the electrical connection, welding is desirably employed. However, the importance of the notch formed in the first electrode increases especially when the first current collecting lead is electrically connected to the sealing member and the second current collecting lead is electrically connected to the inner surface of the metal can. In this structure, the first electrode has a polarity different from that of the metal can, so that it becomes important to prevent the inner surface of the metal can from coming into contact with an end of the first electrode. By notching the winding termination portion disposed on the outermost periphery of the electrode group, at the end of the first electrode disposed on the end surface of the electrode group, the winding termination portion hardly comes into contact with the inner surface of the metal can.

The length of the notch in the view from the end-surface (the first or second end surface) of the electrode group is not particularly limited. In order to keep a balance between the easiness to manufacture the electrodes and the effect of preventing a short circuit, this length is set at 1% or more and 100% or less of the length of the part of the first electrode that is disposed on the outermost periphery, for example. From the viewpoint of producing a sufficient effect of preventing a short circuit, the length of the notch is preferably 3% or more of the length of the part of the first electrode that is disposed on the outermost periphery, more preferably 5% or more. In consideration of the easiness to manufacture a die used for forming the notch, 50% or less is preferable, and 30% or less is more preferable.

The shape of the notch is not particularly limited. However, in consideration of the easiness of the process of forming the notch, a rectangular shape is preferable.

When the first end surface of the electrode group is disposed on the opening side of the metal can, the first current collecting lead is extended from the first end surface toward the opening side. Thus, it is easy that the first current collecting lead is electrically connected to the sealing member.

At this time, preferably, an end of the first current collector sheet that is disposed on the first end surface of the electrode group includes a first uncoated portion that has no first active material layer on either surface thereof. The first current collecting lead is connected to the first uncoated portion. Thus, the end of the first current collector sheet in the direction perpendicular to the winding axis direction does not require an uncoated portion to be connected to the first current collecting lead. Therefore, unnecessary increase in diameter of the electrode group can be avoided. In this case, at least winding termination portion of the first uncoated portion is notched or cut. The first current collector sheet is exposed on the first uncoated portion, so that it is very important to suppress a short circuit due to a positional displacement.

Preferably, the first uncoated portion includes an insulating layer that covers an edge surface of the first uncoated portion and covers both surfaces of the first uncoated portion so as to enclose the notch. The existence of the insulating layer further suppresses the occurrence of a short circuit due to a positional displacement.

Preferably, the insulating layer is insulating tape that includes an insulating sheet and an adhesive layer disposed on one surface of the insulating sheet. Using such insulating tape facilitates work of covering the first uncoated portion with the insulating layer, and can reduce the manufacturing cost. When the insulating tape is used, the first uncoated portion is grasped by the insulating tape from the front and rear sides so as to cover the edge surface of the first uncoated portion.

Preferably, the insulating layer overhangs from the edge surface of the first uncoated portion. Thus, the occurrence probability of an internal short circuit is further reduced, a root (a portion near the end surface of the first uncoated portion) of the first current collecting lead is fixed via the insulating layer, and the motion of the first current collecting lead is suppressed. Thus, the first current collecting lead is restrained so as to face directly upward, and the risk that an internal short circuit is caused by the first current collecting lead is reduced. Preferably, the insulating layer overhangs from the edge surface of the first uncoated portion along the full length of the first electrode disposed on the first end surface.

Preferably, an end of the separator projects beyond the edge surface of the first uncoated portion on the first end surface of the electrode group. Thus, the risk of an internal short circuit can be further reduced. Preferably, the end of the first uncoated portion projects beyond the end of a second current collector sheet. Thus, the first uncoated portion can be strongly connected to the first current collecting lead.

When the insulating layer overhangs from the edge surface of the first uncoated portion on the first end surface, it is not necessary that the end of the separator projects to the first end-surface side beyond the edge surface of the first uncoated portion. Preferably, the end of the separator projects to the first end-surface side beyond the endmost portion of the notch at the winding termination portion side. That is because the endmost portion of the notch on the winding termination side is apt to be most affected by a positional displacement and is apt to cause an internal short circuit.

From the viewpoint of fixing the root of the first current collecting lead, the whole of the first uncoated portion is not always required to be covered with the insulating layer. However, it is preferable that at least an overlapping portion of the first current collecting lead and the first uncoated portion is covered with the insulating layer. It is also preferable that 90% or more of the first uncoated portion is covered with the insulating layer. By covering, with the insulating layer, 90% or more of the total area of both surfaces of the first uncoated portion, the effect of reducing the risk of an internal short circuit further increases.

Even when the first uncoated portion is covered with the insulating layer, the insulating layer on the outer periphery side is stretched to the center side of the electrode group due to the curvature difference. Therefore, when a notch does not exist in the winding termination portion of the first uncoated portion, the endmost portion of the winding termination portion of the first uncoated portion can be exposed. While, when a notch exists in the winding termination portion of the first uncoated portion, the short-circuit preventing effect due to the insulating layer is certainly secured.

Preferably, a second uncoated portion having no second active material layer is formed on at least one surface of one end of the second current collector sheet in the direction perpendicular to the winding axis direction of the electrode group. In this case, the second current collecting lead is connected to the second uncoated portion. Thus, a connection portion of the second current collecting lead can be kept, and the second current collecting lead is easily extended from the first end surface toward the opening side. Therefore, when a cylindrical metal can having a small outer diameter is employed, work of electrically connecting the second current collecting lead to the inner surface of the metal can be performed near the opening in the metal can.

Preferably, the second uncoated portion is disposed in a band shape along the one end. Thus, the second current collecting lead can be strongly connected to the second uncoated portion by welding. Here, the other end of the second current collector sheet in the direction perpendicular to the winding axis direction may coincide with an end of the second active material layer, or may include an uncoated portion on which the second current collector sheet is exposed. Preferably, such an uncoated portion is also disposed in a band shape along the other end.

Preferably, the opposite ends (namely, the opposite ends are disposed on the bottom side and the opening side of the metal can) of the second current collector sheet in the winding axis direction of the electrode group coincide with the opposite ends of the second active material layer in the same direction. In other words, preferably, both surfaces of the opposite ends in the winding axis direction have a second active material layer. Thus, the facing surface area of the second active material layer and first active material layer can be sufficiently increased. The risk that an internal short circuit is caused by the contact between the second current collector sheet and the first uncoated portion can be significantly reduced.

At this time, the second active material layer is not required to cover up to the edge surfaces of the opposite ends of the second current collector sheet in the winding axis direction. The second active material layer is not required to cover each end over the full length. For example, it is sufficient that 50% or more of the full length of each end is covered with the second active material layer.

Preferably, the opposite ends of the first current collector sheet in the direction perpendicular to the winding axis direction coincide with the opposite ends of the first active material layer in the same direction. In other words, preferably, both surfaces of the opposite ends in the direction perpendicular to the winding axis direction have a first active material layer. Thus, the facing surface area of the first active material layer and second active material layer can be sufficiently increased. Also in this case, the first active material layer is not required to cover up to the edge surface of each end. Furthermore, it is sufficient that 50% or more of the full length of each end is covered with the first active material layer.

The importance of the notch formed in the first electrode increases especially when the battery case has a cylindrical shape having an outer diameter of 10 mm or less for example, furthermore 6 mm or less, and especially 4.5 mm or less. That is because, when the outer diameter of the battery case decreases, a positional displacement due to the curvature difference between the inner periphery and the outer periphery, a winding displacement in the winding axis direction, and a folding of the separator are apt to occur. Here, the outer diameter, for example, the outer diameter of the cross section perpendicular to the axial direction of the metal can.

From the viewpoint of keeping the strength, preferably, the metal can is made of stainless steel and the can wall has a thickness of 0.05 mm to 0.2 mm. This condition can achieve a small winding-type battery having a high capacity and a high strength. However, the outer diameter of a cylindrical metal can is difficult to be made less than 1 mm, and it is preferable that the outer diameter is 1 mm or more.

Hereinafter, taking, as an example, the case that the first electrode is a positive electrode and the second electrode is a negative electrode, an exemplary embodiment of the present invention is described in detail with reference to the accompanying drawings. For simplifying the description, elements having substantially the same functions are denoted by the same reference marks in the following drawings.

Here, the winding axis direction of the electrode group is referred to as "first direction", and the direction perpendicular to the winding axis direction is referred to as "second direction".

(Positive Electrode)

As shown in FIG. 1, positive electrode 4 includes: positive-electrode current collector sheet 40 as the first current collector sheet; and positive-electrode active material layers 41 formed on the opposite surfaces of positive-electrode current collector sheet 40. Positive-electrode current collector sheet 40 has a rectangular shape. In the present exemplary embodiment, the longitudinal direction (Y direction in FIG. 1) coincides with the winding axis direction (first direction). One end (hereinafter, first end) in the first direction includes first uncoated portion 40a on which positive-electrode current collector sheet 40 is exposed. The first end is disposed on the first end-surface side of the electrode group. First uncoated portion 40a is disposed in a band shape along the first end. One end of strip-shaped positive-electrode current collecting lead 24 is connected to first uncoated portion 40a by welding.

The right side (Out) of arrow Aa shown in FIG. 1 (a) indicates the winding termination side on the outermost periphery of the electrode group. The left side (In) of arrow Aa indicates the center side (winding start side) of the electrode group. In the present exemplary embodiment, rectangular first notch 70a and second notch 80a are formed in winding termination portion 70 and winding start portion 80 of first uncoated portion 40a, respectively.

Figure 2:
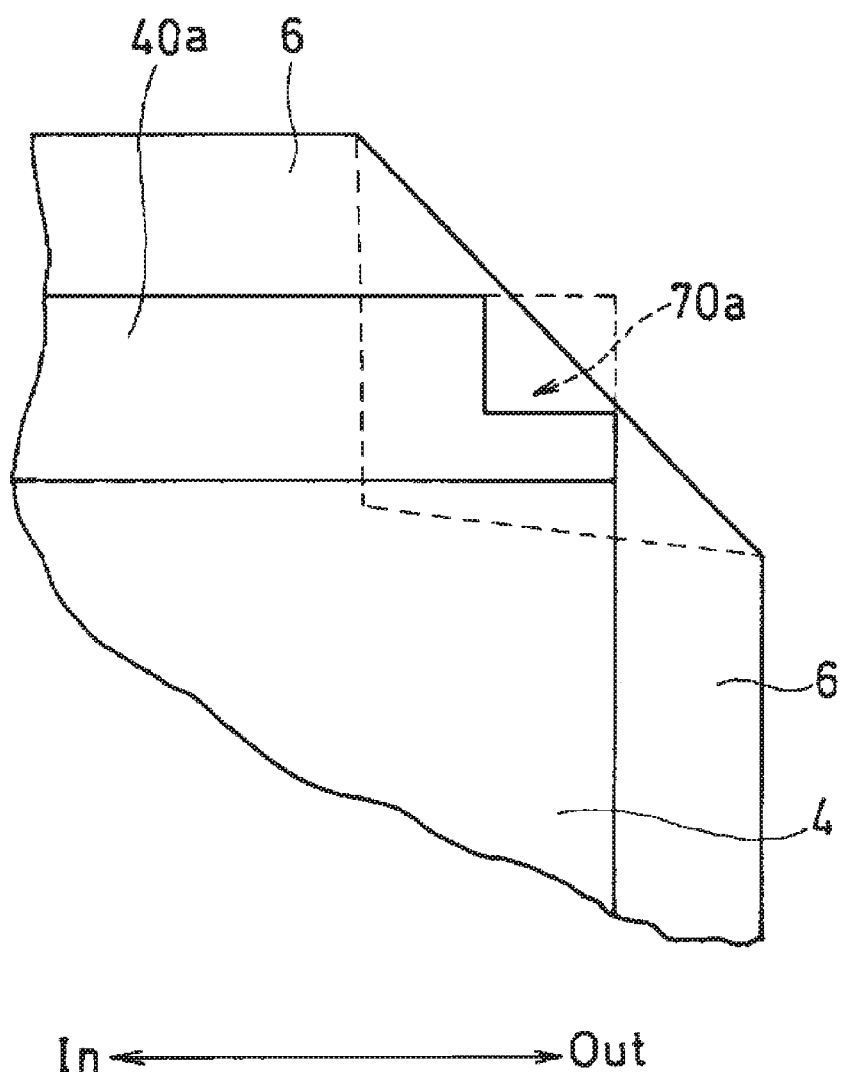
FIG. 2 is a diagram showing a positional relationship, when a separator is folded, between a winding termination portion at an end of the first electrode and the separator.

By forming first notch 70a in winding termination portion 70, the following advantage is produced:

when a corner of separator 6 is folded as shown in FIG. 2 for example, the probability that winding termination portion 70 at the end of the first electrode extends off the separator becomes low.

In the center of the electrode group, a folding or a winding displacement of the separator hardly occurs. Therefore, second notch 80a is not always required to be formed.

Figure 3:
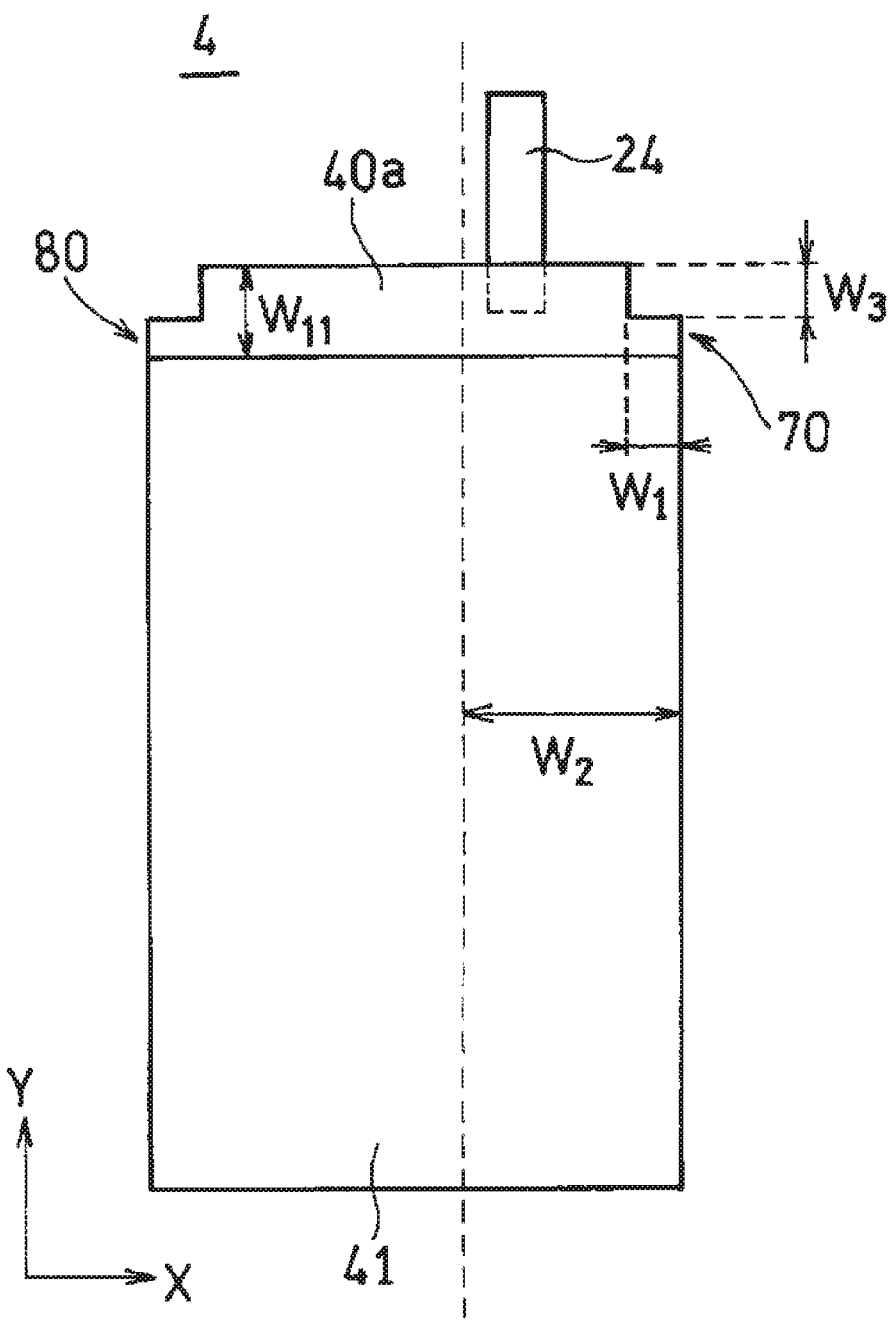
FIG. 3 is an explanatory diagram showing the dimension of a notch formed in the first electrode.

Hereinafter, the dimensions of the notches are described with reference to FIG. 3.

Length W1 of rectangular first notch 70a in the view from the end-surface side of the electrode group is 1% to 100% of length W2 of a portion disposed on the outermost periphery of first electrode 4, preferably 3% to 50%, more preferably 5% to 30%. Specific length W1 is for example 0.1 mm to 5 mm, preferably 1 mm to 3 mm Length W2 is selected in accordance with the outer diameter of the metal can or the battery capacity. Length W2 is for example 5 mm to 15 mm, and preferably 7 mm to 11 mm from the viewpoint of downsizing and thinning the battery. A maximum length (height) W3 of first notch 70a in the winding axis direction is not particularly limited, but is preferably 10% to 100% of width W11 of first uncoated portion 40a.

The length of second notch 80a in the view from the end-surface side of the electrode group is not particularly limited, but is 1% to 250% of length W1 or 10% to 250% thereof, for example. The maximum length (height) of second notch 80a in the winding axis direction is preferably 95% to 105% of height W3, more preferably is equal to height W3.

Figure 4:
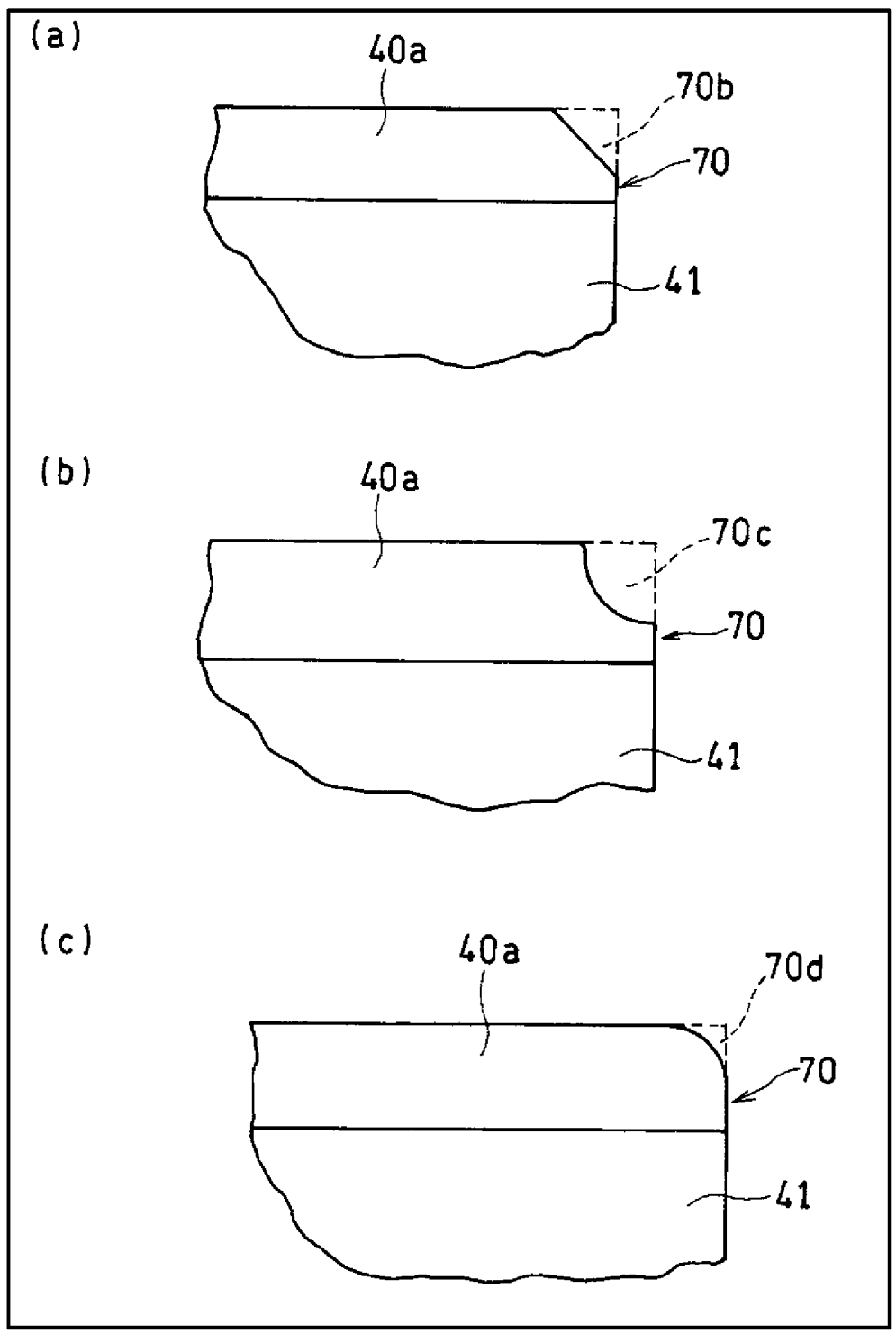
FIG. 4 is a diagram showing variation of the shape of the notch.

The shape of each notch is not limited to a rectangular shape, may be any shape. For example, tapered (wedge-shaped) notch 70b as shown in FIG. 4 (a), arc-shaped notch 70c as shown in FIG. 4 (b), and R-shaped notch 70d as shown in FIG. 4 (c) may be employed.

At the other end (hereinafter, second end) of positive electrode 4 in the first direction, the positive-electrode current collector sheet is not exposed, and positive-electrode active material layer 41 is formed on the whole of both surfaces except edge surface 40b of the second end. Also at each of the opposite ends of positive-electrode current collector sheet 40 in the second direction (X direction in FIG. 1), the whole of both surfaces except the edge surface and the portion corresponding to the first uncoated portion is covered with positive-electrode active material layer 41. A positive electrode having such a structure can be easily manufactured by the following steps:

producing a pole-plate original fabric by coating a large material sheet for positive-electrode current collector sheet 40 with a material mixture of positive-electrode active material layer 41 in a stripe shape; and then cutting the pole-plate original fabric into a predetermined shape.

Here, "edge surface" corresponds to the cross section in the thickness direction that is formed when the current collector sheet is cut.

Width W10 of positive-electrode current collector sheet 40 in the first direction is selected in accordance with the length of the metal can or the battery capacity. Width W11 of first uncoated portion 40a is preferably 2 mm to 4 mm. When width W11 is within this range, the surface area of positive-electrode active material layer 41 formed on the surface of positive-electrode current collector sheet 40 can be sufficiently increased, and also the strength of a junction to positive-electrode current collecting lead 24 is easily kept.

Figure 5:
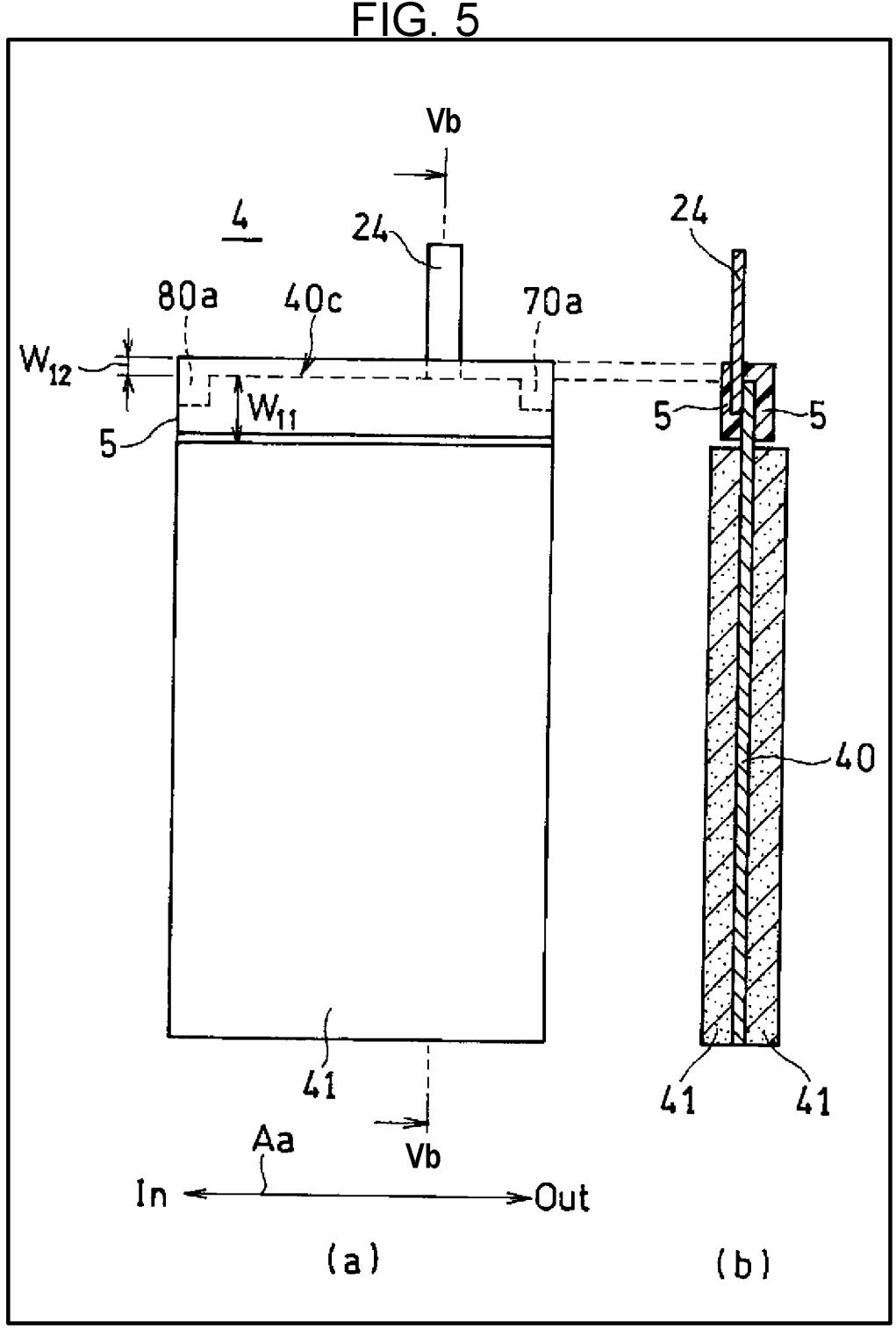
FIG. 5 is a diagram schematically showing a first electrode in which a first current collecting lead is connected to a first uncoated portion and the first uncoated portion is covered with an insulating layer, (a) is a plan view schematically showing the first electrode in which the first current collecting lead is connected to the first uncoated portion and the first uncoated portion is covered with the insulating layer, and (b) is a sectional view of the first electrode taken along line Vb-Vb.

FIG. 5 schematically shows the state in which the front and rear surfaces of first uncoated portion 40a of positive-electrode current collector sheet 40 are covered with insulating layer 5. Insulating layer 5 is disposed in a band shape along the first end so as to cover edge surface 40c of the first end. At this time, preferably, insulating layer 5 covers edge surface 40c of first uncoated portion 40a, and covers both surfaces of first uncoated portion 40a so as to enclose first notch 70a and second notch 80a.

When edge surface 40c of the first end is covered with insulating layer 5, insulating layer 5 slightly overhangs from edge surface 40c of the first end. Thus, the risk that an internal short circuit is caused by the existence of first uncoated portion 40a is reduced. An overlapping portion of positive-electrode current collecting lead 24 and first uncoated portion 40a is covered with insulating layer 5, and the root of positive-electrode current collecting lead 24 is fixed via insulating layer 5. Therefore, the motion of positive-electrode current collecting lead 24 is suppressed, and the risk that an internal short circuit is caused by positive-electrode current collecting lead 24 is also reduced.

Figure 6:
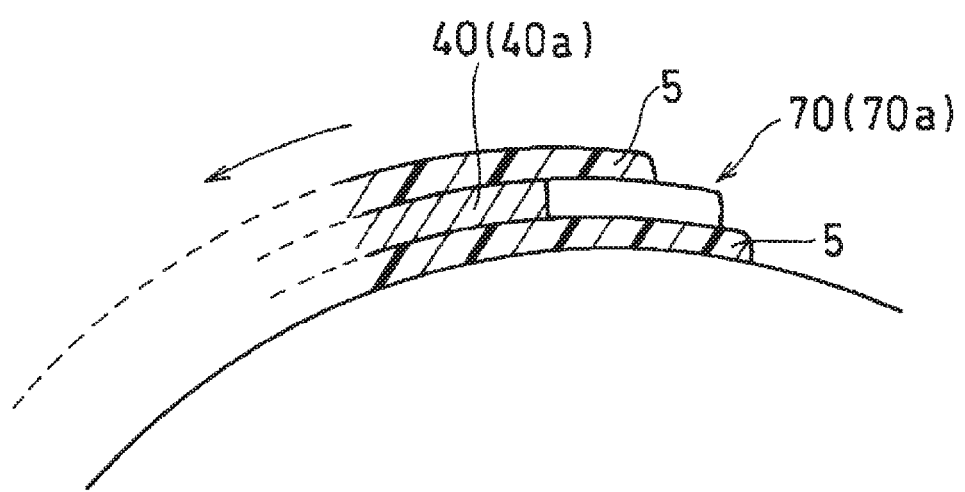
FIG. 6 is a diagram showing the state in which the insulating layer on the outer peripheral side is stretched to the center side of an electrode group, at the winding termination portion of the first electrode in the view from a first end-surface side of the electrode group.

FIG. 6 schematically shows winding termination portion 70 of first electrode 4 in the view from the first end-surface side of the electrode group. On the outermost periphery of the electrode group, insulating layer 5 on the outer peripheral side is stretched to the center side of the electrode group due to the curvature difference. Therefore, the endmost portion of the winding termination portion of first uncoated portion 40a is apt to be exposed. While, when notch 70a exists in winding termination portion 70 of first uncoated portion 40a, the exposure of first uncoated portion 40a is suppressed because the endmost portion to be exposed is removed.

Overhang width W12 of insulating layer 5 from edge surface 40c at the first end is preferably 0.1 mm to 1 mm, more preferably 0.4 mm to 0.6 mm Thus, the effect of fixing the root of positive-electrode current collecting lead 24 via insulating layer 5 is enhanced, and unnecessary increase in the length of the electrode group in the first direction can be avoided.

FIG. 5 shows the state in which first uncoated portion 40a is not completely covered with insulating layer 5. However, preferably 90% or more of the total area of both surfaces of first uncoated portion 40a is covered with insulating layer 5. More preferably, first uncoated portion 40a is completely covered with insulating layer 5.

Insulating layer 5 is made of an insulating material. As the insulating material, a pressure sensitive adhesive containing an insulating resin component is preferable. For example, a rubber pressure sensitive adhesive, an acrylic pressure sensitive adhesive, a silicone pressure sensitive adhesive, or a urethane pressure sensitive adhesive can be employed. The pressure sensitive adhesive includes, in addition to the resin component, a tackifier, a cross-linker, a softener, or an anti-aging agent if necessary. The rubber pressure sensitive adhesive includes a rubber component such as natural rubber, butyl rubber, or isoprene rubber. The acrylic pressure sensitive adhesive includes a polymer of acrylic monomer such as acrylonitrile, (metha) acrylic acid, or (metha) acrylic acid ester. The silicone pressure sensitive adhesive includes polysiloxane or silicone rubber.

As insulating layer 5, insulating tape may be employed. Using the insulating tape facilitates work of covering first uncoated portion 40a with the insulating layer. The insulating tape includes an insulating sheet (substrate film), and a pressure sensitive adhesive layer disposed on one surface of the insulating sheet. The pressure sensitive adhesive layer includes the above-mentioned pressure sensitive adhesive.

The insulating sheet may include a film of polyolefin or engineering plastic. This film is, for example, a polypropylene film, a polyethylene terephthalate film, a polyimide film, or a polyphenylene sulfide (PPS) film Especially, a polypropylene film having a thickness of 20 μm to 60 μm is preferable because the influence of distortion on the electrode group is small.

The thickness of insulating layer 5 is preferably equal to or smaller than the thickness of the positive-electrode active material layer, more preferably 20% to 50% of the thickness of the positive-electrode active material layer. Disposing insulating layer 5 having such a thickness on the first uncoated portion produces the following advantage: even when an electrode group having a small diameter is formed, distortion by insulating layer 5 hardly affects the electrode group, and a local variation in the inner pressure of the electrode group is suppressed.

Positive-electrode current collector sheet 40 is a porous or non-porous conductive substrate. In the case that the cylindrical battery is a lithium-ion battery, preferably, metal foil of aluminum or aluminum alloy is employed as the material of positive-electrode current collector sheet 40, for example. The thickness of the positive-electrode current collector sheet is not particularly limited, but is preferably 10 μm to 20 μm.

Positive-electrode active material layer 41 includes a positive-electrode active material as an essential component, and includes a binder and conductive agent as optional components. As the positive-electrode active material of a lithium-ion secondary battery, a composite oxide containing lithium is preferable, and $LiCoO_2$, $LiNiO_2$, or $LiMn_2O_4$ is employed for example. As the positive-electrode active material of a lithium-ion primary battery, manganese dioxide or graphite fluoride is employed. In producing positive-electrode active material layer 41, a positive-electrode material mixture containing a positive-electrode active material is mixed with a liquid component to prepare positive-electrode slurry. Next, the surface of the positive-electrode current collector sheet is coated with the positive-electrode slurry, and the coated film is dried. Next, the dried coated film is rolled together with the positive-electrode current collector sheet, thereby producing a positive-electrode active material layer having a predetermined thickness. The thickness of the positive-electrode active material layer is not particularly limited, but is preferably 70 μm to 130 μm.

As the material of positive-electrode current collecting lead 24 in a lithium-ion battery, preferably, aluminum, aluminum alloy, nickel, nickel alloy, iron, or stainless steel is employed, for example. The thickness of positive-electrode current collecting lead 24 is preferably 10 μm to 120 μm, more preferably 20 μm to 80 μm. The shape of positive-electrode current collecting lead 24 is not particularly limited. When the metal can has a cylindrical shape having a diameter of 10 mm or less, however, positive-electrode current collecting lead 24 has a stripe shape having a width of 0.5 mm to 3 mm and a length of 3 mm to 10 mm, for example.

(Negative Electrode)

Figure 7:
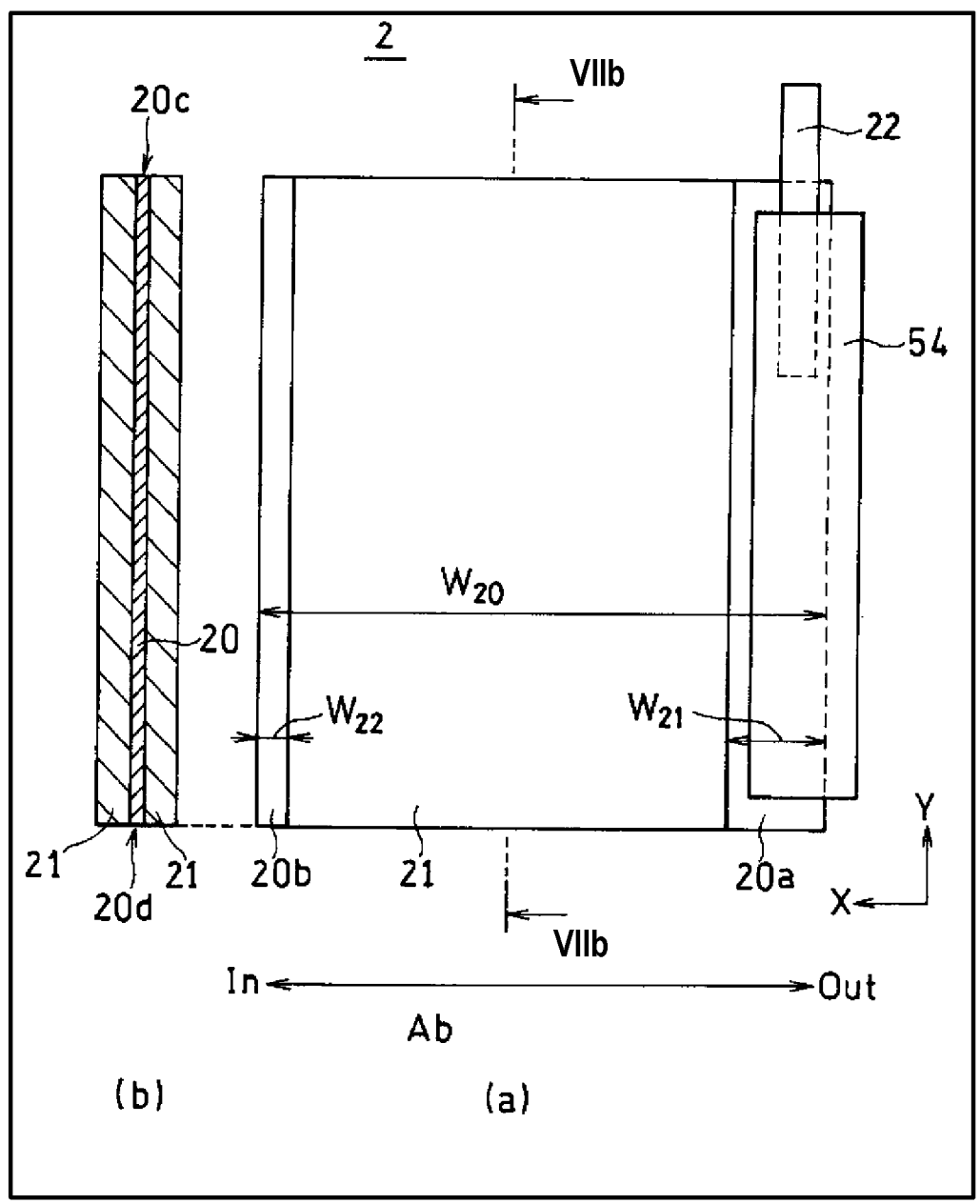
FIG. 7 is a diagram schematically showing a second electrode in which a second current collecting lead is connected to a second uncoated portion, (a) is a plan view schematically showing the second electrode in which the second current collecting lead is connected to the second uncoated portion, and (b) is a sectional view of the second electrode taken along line VIIb-VIIb.

As shown in FIG. 7, negative electrode 2 includes: negative-electrode current collector sheet 20 as the second current collector sheet; and negative-electrode active material layers 21 formed on the opposite surfaces of negative-electrode current collector sheet 20. The right side (Out) of arrow Ab indicates the winding termination side on the outermost periphery of the electrode group. The left side (In) of arrow Ab indicates the center side (winding start side) of the electrode group. Negative-electrode current collector sheet 20 has a rectangular shape in which the length in the second direction is set longer than that of positive-electrode current collector sheet 40. One end (hereinafter, first end) in the second direction (X direction in FIG. 7) of negative-electrode current collector sheet 20 includes a relatively wide second uncoated portion (A) 20a on which the negative-electrode current collector sheet is exposed. Second uncoated portion (A) 20a is disposed in a band shape along the first end. Second uncoated portion (A) 20a is connected to one end of strip-shaped negative-electrode current collecting lead 22 by welding.

The other end (hereinafter, second end) of negative-electrode current collector sheet 20 in the second direction includes a band-shaped second uncoated portion (B) 20b on which negative-electrode current collector sheet 20 is exposed. Such an exposed portion of negative-electrode current collector sheet 20 is disposed for suppressing the peeling of the negative-electrode active material layer.

The opposite ends of negative-electrode current collector sheet 20 in the first direction (Y direction in FIG. 7) are covered with negative-electrode active material layer 21, except edge surfaces 20c and 20d at the opposite ends and the portions corresponding to second uncoated portions 20a and 20b. Thus, the facing surface area of positive-electrode active material layer 41 and negative-electrode active material layer 21 can be sufficiently increased, and the risk that an internal short circuit is caused by the contact between first uncoated portion 40a and negative-electrode current collector sheet 20 can be significantly re duce d.

Preferably, width W21 of second uncoated portion (A) 20a is 10% to 50% of width W20 of negative-electrode current collector sheet 20 in the second direction. When width W21 is within this range, the surface area of negative-electrode active material layer 21 formed on the surface of negative-electrode current collector sheet 20 can be sufficiently increased, and the strength of a junction to negative-electrode current collecting lead 22 is easily kept. While, width W22 of second uncoated portion (B) 20b is required to be 1% to 10% of width W20. Second uncoated portion (B) 20b is not always necessary. A negative-electrode active material layer may be formed in at least a part of the rear surface of each of second uncoated portions 20a and 20b. Alternatively, the rear surface of each of second uncoated portions 20a and 20b may be an uncoated portion on which a negative-electrode current collector sheet is exposed, similarly to the front surfaces.

Negative-electrode current collector sheet 20 is a porous or non-porous conductive substrate. When the cylindrical battery is a lithium-ion battery, preferably, metal foil of stainless steel, nickel, copper, copper alloy, or aluminum is employed as the material of the negative-electrode current collector sheet, for example. The thickness of the negative-electrode current collector sheet is not particularly limited, but is preferably 5 μm to 20 μm.

Negative-electrode active material layer 21 includes a negative-electrode active material as an essential component, and includes a binder and conductive agent as optional components. As the negative-electrode active material of the lithium-ion battery, metal lithium, an alloy (silicon alloy or tin alloy), a carbon material (graphite or hard carbon), a silicon compound, a tin compound, or a lithium titanate compound is employed. In producing negative-electrode active material layer 21, a negative-electrode material mixture containing a negative-electrode active material is mixed with a liquid component to prepare negative-electrode slurry. Next, the surface of the negative-electrode current collector sheet is coated with the negative-electrode slurry, and the coated film is dried. Next, the dried coated film is rolled together with the negative-electrode current collector sheet, thereby producing a negative-electrode active material layer having a predetermined thickness. The thickness of the negative-electrode active material layer is not particularly limited, but is preferably 70 μm to 150 μm. When the negative-electrode active material is an alloy or compound, an active material layer may be produced through a vacuum process.

As the material of negative-electrode current collecting lead 22 of the lithium-ion battery, preferably, nickel, nickel alloy, iron, stainless steel, copper, or copper alloy is employed, for example. The thickness of negative-electrode current collecting lead 22 is preferably 10 μm to 120 μm, more preferably 20 μm to 80 μm. The shape of negative-electrode current collecting lead 22 is not particularly limited. When the metal can has a cylindrical shape having a diameter of 10 mm or less, however, negative-electrode current collecting lead 22 has a stripe shape having a width of 0.5 mm to 3 mm and a length of 9 mm to 15 mm, for example.

As the binder usable for the positive-electrode active material layer and/or the negative-electrode active material layer, for example, fluorine resin (polyvinylidene fluoride or polytetrafluoroethylene), polyamide, polyimide, polyamide-imide, polyacrylic acid, or styrene-butadiene rubber is employed. As the conductive agent usable for the positive-electrode active material layer and/or the negative-electrode active material layer, graphite, carbon black, or carbon fiber is employed, for example.

FIG. 7 schematically shows the state in which negative-electrode current collecting lead 22 is connected to second uncoated portion (A) 20a and fixing insulating tape 54 is pasted on second uncoated portion (A) 20a. Fixing insulating tape 54 is used for fixing the outermost periphery of the electrode group after winding, but also partially covers an overlapping portion of negative-electrode current collecting lead 22 and second uncoated portion (A) 20a. Thus, a connection portion between negative-electrode current collecting lead 22 and negative-electrode current collector sheet 20 is easily kept.

Figure 8:
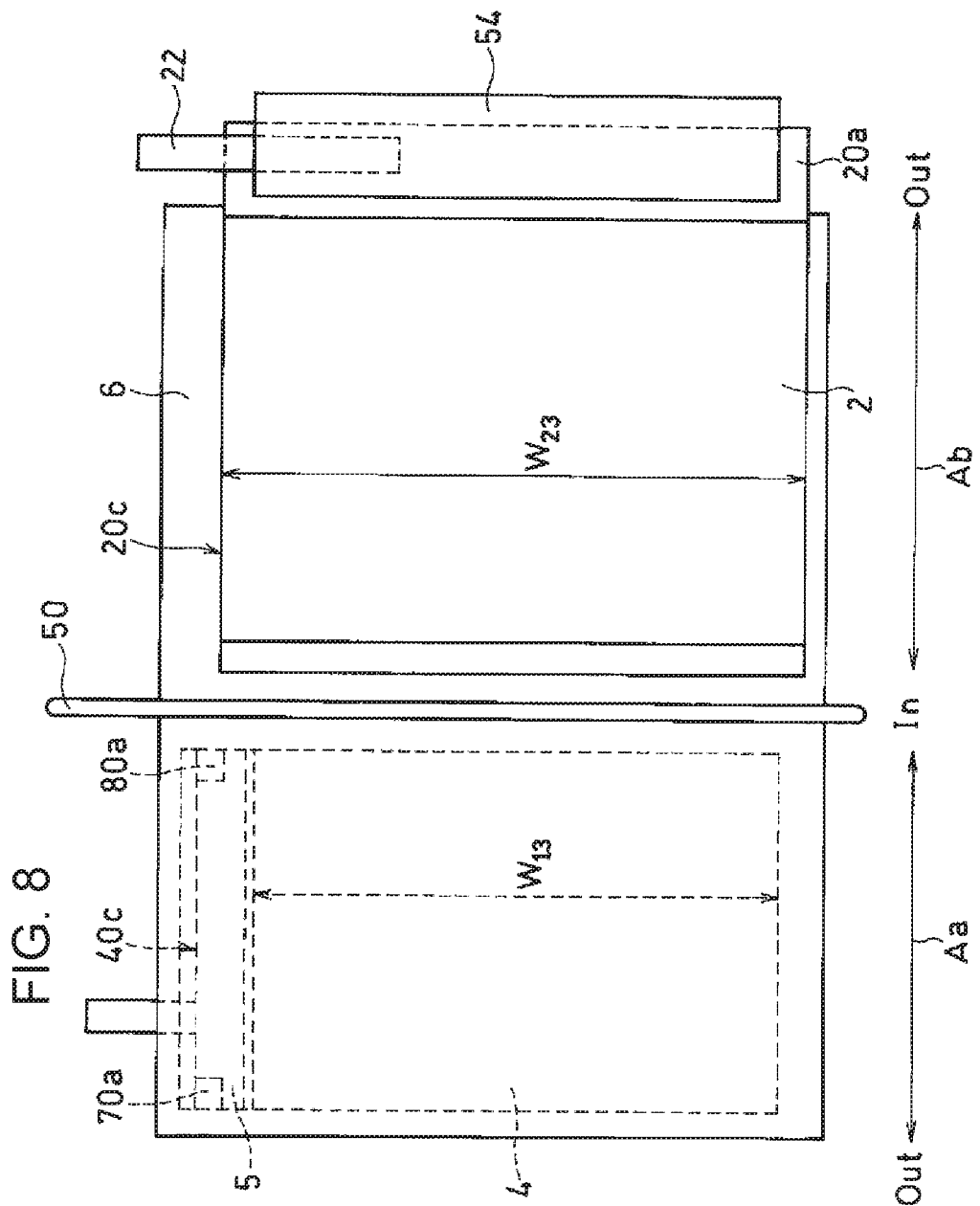
FIG. 8 is a plan view schematically showing a configuration of the electrode group before winding.

FIG. 8 is a plan view schematically showing a configuration of the electrode group before winding.

In the shown example, with respect to separator 6, positive electrode 4 is disposed on the left and rear sides of separator 6 and negative electrode 2 is disposed on the right and front sides of separator 6. Width W13 of positive-electrode active material layer 41 in the winding axis direction (first direction) is slightly narrower than width W23 of negative-electrode active material layer 21 in the first direction. Thus, positive electrode 4 and negative electrode 2 are stacked so that positive-electrode active material layer 41 is completely overlaid on negative-electrode active material layer 21. Such a stacked body of positive electrode 4, separator 6, and negative electrode 2 is wound about winding core 50, thereby producing an electrode group.

Each of the opposite ends of separator 6 in the first direction projects beyond the corresponding ends of positive electrode 4 and negative electrode 2. Thus, the risk of an internal short circuit is further reduced. Edge surface 40c of first uncoated portion 40a projects beyond edge surface 20c of negative-electrode current collector sheet 20. Thus, the connection region between first uncoated portion 40a and positive-electrode current collecting lead 24 can be kept, and strong connection is allowed. In the above-mentioned positional relationship, the position of the edge surface of the negative-electrode current collector sheet faces insulating layer 5 that covers first uncoated portion 40a, and the risk that an internal short circuit is caused by the edge surface of the negative-electrode current collector sheet is significantly reduced.

One end (second uncoated portion (A) 20a) of negative electrode 2 in the second direction overhangs from separator 6. The overhanging portion faces the inner surface of the side wall of the metal can.

Figure 9:
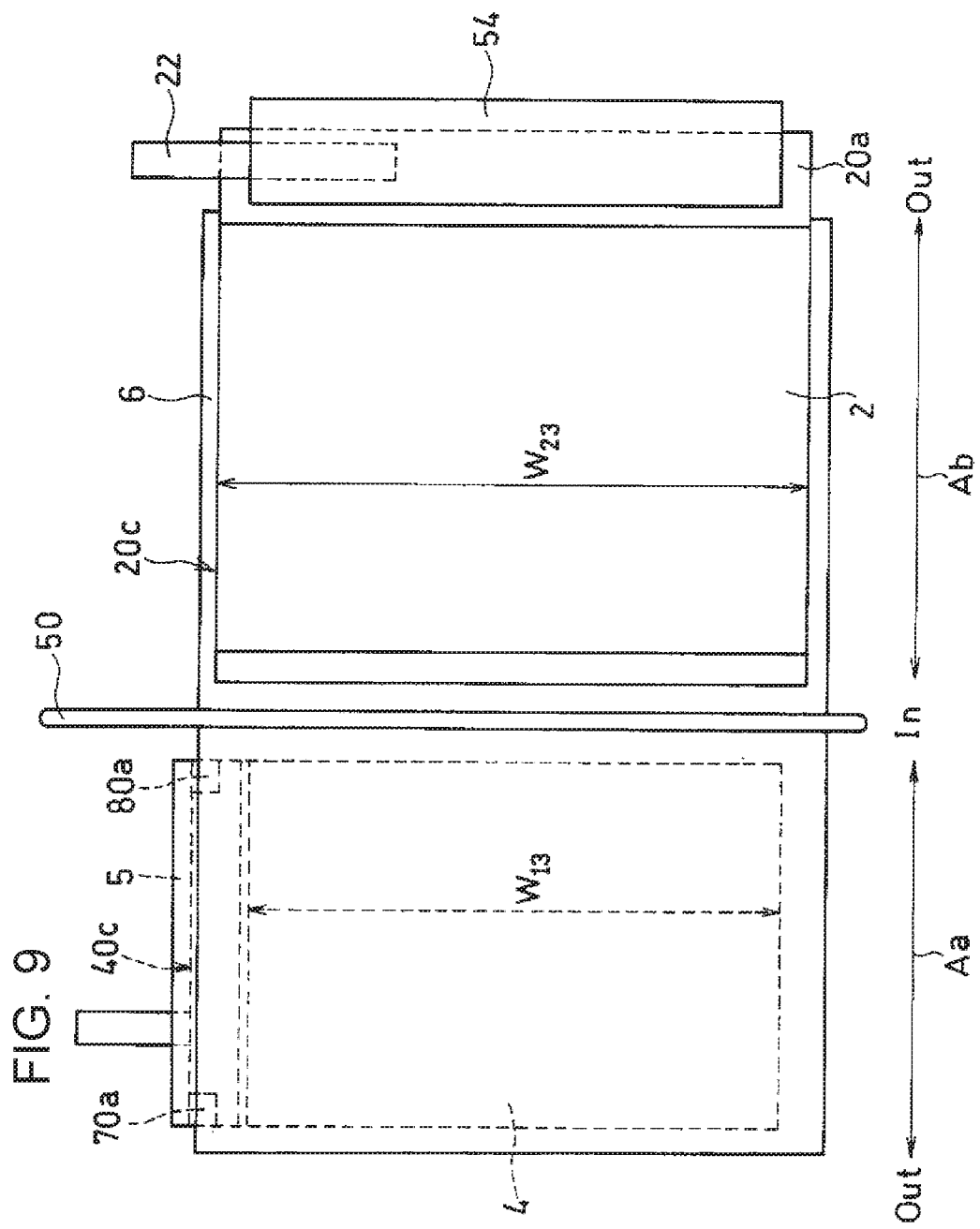
FIG. 9 is a plan view schematically showing another configuration of the electrode group before winding.

In FIG. 8, each of the opposite ends of separator 6 in the first direction projects beyond the corresponding ends of positive electrode 4 and negative electrode 2. However, the positional relationship is not limited to this. When insulating layer 5 overhangs from edge surface 40c of first uncoated portion 40a, it is sufficient that an end of separator 6 projects to the first end-surface side beyond the endmost portions of notches 70a and 80a on the winding termination side, as shown in FIG. 9.

Figure 10:
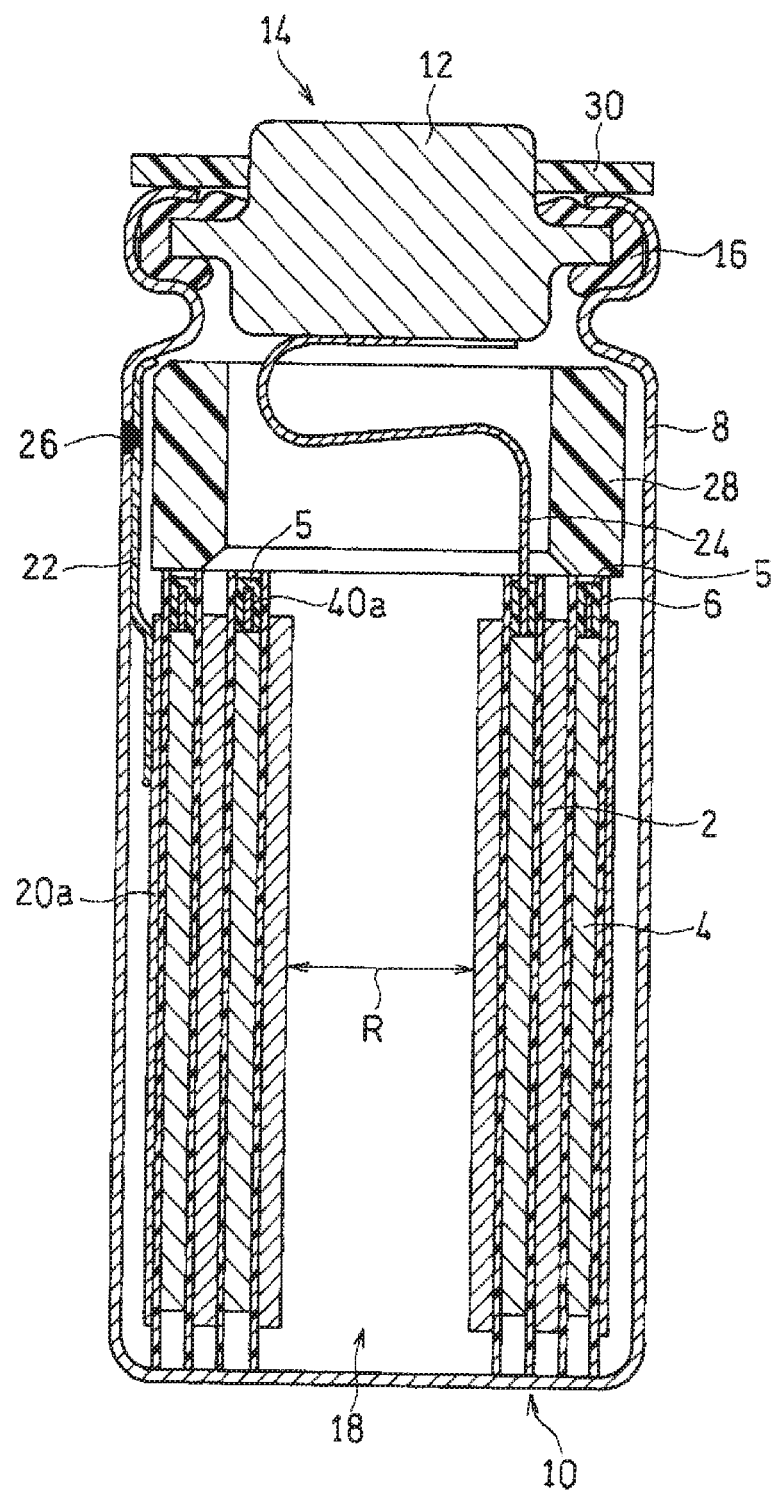
FIG. 10 is a vertical sectional view of a cylindrical battery in accordance with an exemplary embodiment of the present invention.

FIG. 10 is a vertical sectional view of a cylindrical battery in accordance with the exemplary embodiment of the present invention.

A power generating element of a cylindrical battery includes positive electrode 4 as a first electrode, negative electrode 2 as a second electrode, separator 6 interposed between the first electrode and the second electrode, and an electrolyte (not shown). Positive electrode 4 and negative electrode 2 are wound via separator 6 to produce a winding-type electrode group. The battery case includes bottomed cylindrical metal can 8 and sealing member 12 for sealing an opening in metal can 8. The winding axis of the electrode group coincides with the center axis of metal can 8, the proximity of the winding axis forms hollow portion 18 (diameter R) having no power generating element.

When the curvature radius of the winding start portion is too small, an active material layer can peel from a current collector sheet. Therefore, it is necessary that the diameter of winding core 50 is not too small. While, when the diameter of winding core 50 is too large, the battery capacity decreases. It is preferable to select winding core 50 so that the diameter of the hollow portion of the electrode group is 3 mm or less, preferably less than 1.5 mm. The winding core may be left in the battery without being pulled out.

After the stacked body is wound to produce an electrode group, winding core 50 is pulled out. Therefore, a hollow portion of diameter R is formed in the center of the electrode group. Then, the electrode group is accommodated in metal can 8. At this time, the first end surface from which negative-electrode current collecting lead 22 and positive-electrode current collecting lead 24 are projected is disposed on the opening side of metal can 8.

One end of negative-electrode current collecting lead 22 is electrically connected to the exposed portion (second uncoated portion (A) 20a) of the negative-electrode current collector sheet of negative electrode 2. The other end of negative-electrode current collecting lead 22 is connected to connection position (welding point) 26 on the inner surface of the side wall near the opening of metal can 8. Metal can 8 also serves as negative-electrode terminal 10. The connection between negative-electrode current collecting lead 22 and connection position 26 is performed by spot welding, for example.

Next, insulating ring-shaped intermediate member 28 is disposed on the electrode group, and one end of positive-electrode current collecting lead 24 is bonded to the lower surface of conductive sealing member 12 by welding. Sealing member 12 also serves as positive-electrode terminal 14.

Then, an electrolyte is injected into metal can 8 by a depressurization method. Finally, the opening end of metal can 8 is caulked to sealing member 12 via insulating member (gasket) 16, thereby producing a cylindrical battery. Insulating ring member 30 is disposed on a rim of sealing member 12 exposed from metal can 8 to the outside, and insulation between metal can 8 and sealing member 12 is secured.

From the viewpoint of sufficiently keeping the connection portion to positive-electrode current collecting lead 24, the edge surface of first uncoated portion 40a of positive-electrode current collector sheet 40 projects to the opening side of metal can 8 beyond the edge surface of negative-electrode current collector sheet 20. However, almost whole—including the edge surface—of first uncoated portion 40a of positive-electrode current collector sheet 40 is covered with insulating layer 5. Therefore, the contact of first uncoated portion 40a with negative-electrode current collecting lead 22, for example, is suppressed. By projecting the edge surface of separator 6 to the opening side of metal can 8 beyond the edge surface of first uncoated portion 40a, the probability of an internal short circuit is further reduced.

(Separator)

As separator 6 interposed between positive electrode 4 and negative electrode 2, an insulating microporous thin film, woven fabric, or nonwoven fabric is employed. As the material of the separator of a lithium-ion battery, preferably, polyolefin such as polypropylene or polyethylene is employed, for example. That is because polyolefin has a high durability and has a shutdown function. The thickness of separator 6 is for example 10 μm to 300 μm, preferably 10 μm to 40 μm, more preferably 10 μm to 25 μm. The microporous thin film may be a monolayer film or multilayer film. The porosity of the separator is preferably 30% to 70%, more preferably 35% to 60%.

(Non-Aqueous Electrolyte)

A non-aqueous electrolyte may be in any state of liquid, gel, or solid. A liquid non-aqueous electrolyte used for a lithium-ion battery generally includes lithium salt and a non-aqueous solvent in which the lithium salt is dissolved. The non-aqueous solvent is not particularly limited. As the non-aqueous solvent, cyclic carbonate, chain carbonate, or cyclic carboxylic acid ester is employed. As the cyclic carbonate, polypropylene carbonate or ethylene carbonate is employed. As the chain carbonate, diethyl carbonate, ethyl methyl carbonate, or dimethyl carbonate is employed. As the cyclic carboxylic acid ester, γ-butyrolactone or γ-valerolactone is employed. As the lithium salt, $LiPF_6$ or $LiBF_4$ is employed, for example.

The above-mentioned exemplary embodiment is just an example of the present invention, and the present invention is not limited to the exemplary embodiment. The present invention is preferably applied to various winding-type non-aqueous electrolyte batteries represented by a lithium-ion battery. The battery may be a primary battery or secondary battery. The shape of the battery is required to be a tubular shape, and may be a cylindrical shape or elliptical cylindrical shape. The size of the battery is not limited either. The technological significance of applying the present invention is enhanced when the metal can has a cylindrical shape having a diameter of 10 mm or less, furthermore 6 mm or less, especially 4.5 mm or less.

INDUSTRIAL APPLICABILITY

The present invention is applicable to a winding-type battery, and is especially useful for obtaining a small cylindrical battery having a high capacity.

The invention claimed is:

1. A wound battery comprising:
a power generating element; and
a battery case accommodating the power generating element,
wherein the power generating element includes:
a first electrode;
a second electrode having a polarity different from a polarity of the first electrode;
a separator interposed between the first electrode and the second electrode; and
an electrolyte, and
the first electrode and the second electrode are wound via the separator to form an electrode group having a first end surface and a second end surface opposite to the first end surface,
wherein the first electrode includes a first current collector sheet and a first active material layer formed on a surface of the first current collector sheet, and a first current collecting lead is coupled to the first electrode,
wherein the second electrode includes a second current collector sheet and a second active material layer formed on a surface of the second current collector sheet, and a second current collecting lead is coupled to the second electrode,
wherein an end of the first electrode disposed on the first end surface of the electrode group and/or an end of the first electrode disposed on the second end surface of the electrode group has a notch in a winding termination portion disposed on an outermost periphery of the electrode group,
wherein the battery case includes:
a bottomed pipe-shaped metal can; and
a sealing member for blocking an opening in the bottomed pipe-shaped metal can, wherein the first current collecting lead is electrically coupled to the sealing member, and
wherein the second current collecting lead is electrically coupled to an inner surface of the battery case,
wherein the first end surface is disposed on an opening side, and
wherein the first current collecting lead is extended from the first end surface toward the opening side.

2. The wound battery according to claim 1, wherein a length of the notch in a view from the first or second end surface is 1% or more and 100% or less of a length of a portion, of the first electrode, disposed on the outermost periphery.

3. The wound battery according to claim 1, wherein the notch has a rectangular shape.

4. The wound battery according to claim 1, wherein a first uncoated portion is disposed on the first current collector sheet, at the end disposed on the first end surface of the electrode group, the first uncoated portion not having the first active material layer on either surface of the first current collector sheet,
the first current collecting lead is coupled to the first uncoated portion, and
the winding termination portion of the first uncoated portion has the notch.

5. The wound battery according to claim 4, further comprising an insulating layer for covering an edge surface of the first uncoated portion, and covering both surfaces of the first uncoated portion so as to enclose the notch.

6. The wound battery according to claim 5, wherein the insulating layer overhangs from the edge surface of the first uncoated portion.

7. The wound battery according to claim 6, wherein on the first end surface, an end of the separator projects to the first end surface side beyond an endmost portion of the notch at the winding termination portion side.

8. The wound battery according to claim 1, wherein a second uncoated portion is disposed at one end of the second current collector sheet in a direction perpendicular to a winding axis of the electrode group, the second uncoated portion not having the second active material layer on at least one surface of the second current collector sheet, the second current collecting lead is coupled to the second uncoated portion, and the second current collecting lead is extended from the first end surface toward the opening side.

9. The wound battery according to claim 1, wherein the battery case has a cylindrical shape having an outer diameter of 10 mm or less.

\* \* \* \* \*